Oct. 13, 1942.   C. L. MOWRER   2,298,832
DETACHABLE NOSEPIECE
Filed Sept. 28, 1940

Inventor
Charles L. Mowrer

By Strauch & Hoffman
Attorneys

Patented Oct. 13, 1942

2,298,832

UNITED STATES PATENT OFFICE 2,298,832

DETACHABLE NOSEPIECE

Charles L. Mowrer, Hagerstown, Md.

Application September 28, 1940, Serial No. 358,915

2 Claims. (Cl. 88—41)

This invention relates to eyeglasses and is more particularly concerned with nosepiece attachments for multifocal eyeglasses.

The present invention will be specifically described in its preferred embodiment as an improvement over the attachment illustrated at Figure 8 of, and claimed in, my co-pending application Serial No. 264,202, filed March 25, 1939, now matured into United States Letters Patent No. 2,220,000 granted October 29, 1940, of which the present application is a continuation-in-part.

It is a major object of the present invention to provide a readily and speedily attachable and removable attachment, adapted for use with any eyeglasses, regardless of the shape or style of nosepiece, bridge or temples and regardless of whether the lenses are rimmed or rimless, for quickly elevating selected lower segments of a multifocal eyeglass into the direct line of vision of the wearer. The invention may be employed with bifocal, trifocal or any multifocal eyeglasses.

A further object of the invention is to provide a readily detachable nosepiece attachment for multifocal eyeglasses wherein an auxiliary nosepiece for elevating selected lower segments of a multifocal eyeglass into the direct line of vision of the wearer is provided with laterally expansible flexible lens or lens rim gripping end portions equipped with suitable finger grip pieces or projections which are manipulated by the eyeglass wearer to quickly and safely attach and remove the attachment. Preferably these projections are integral, resilient terminals of said resilient end portions.

Further objects of the invention will presently appear as the description proceeds in connection with the appended claims and the annexed drawing in which:

Figure 1:
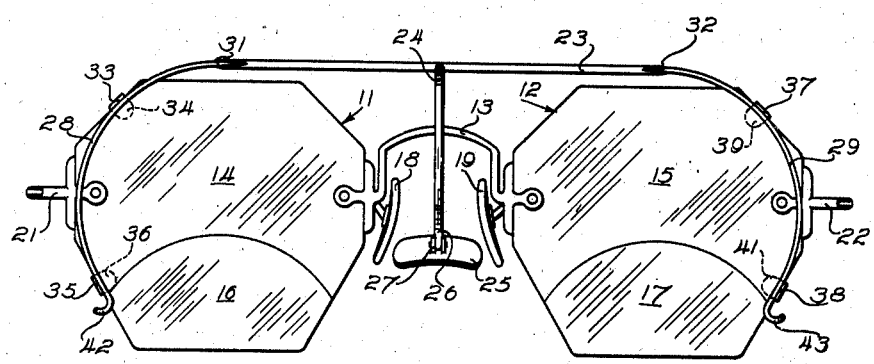
Figure 1 is a front elevation of a rimless high bridge eyeglass equipped with the attachment of the invention.

Figure 1 illustrates conventional bifocal eyeglasses comprising a pair of lens units 11 and 12 rigidly interconnected by a high bridge 13. Lens units 11 and 12 consist of upper or distance lens portions 14 and 15, respectively, and lower or reading segment portions 16 and 17, respectively. Rockable nose pads 18 and 19, carried by bridge 13, engage opposite sides of the wearer's nose and normally support the eyeglasses with distance portions 14 and 15 at such an elevation as to be centrally aligned with the direct straight ahead line of vision of the wearer. The usual temple connections 21 and 22 are secured to lenses 11 and 12 at their outer edges and aid in holding the lenses in proper location.

Using such conventional eyeglasses, the wearer must incline his line of sight downwardly to use the reading segments. This is awkward and unsatisfactory, as well as tiresome to the muscles which control turning of the eyeballs.

My invention comprises a device which is speedily and readily attached to such conventional eyeglasses for selectively elevating them to a position where the reading segments are centrally located in the direct line of vision.

Figure 2:
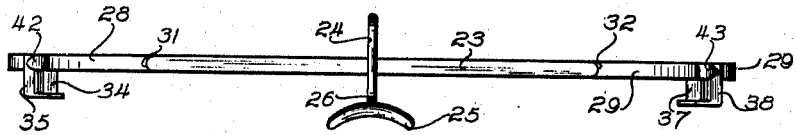
Figure 2 is a bottom plan view of the attachment of Figure 1.
Figure 3:
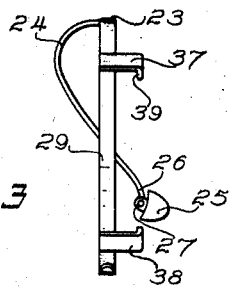
Figure 3 is a side elevation of the attachment of Figure 1.

Referring to Figures 1-3 my attachment includes a relatively thick, flat, transverse, metal arm or cross-bar 23 which is preferably not readily or easily bendable in any direction.

At its medial portion, bar 23 has integrally united thereto, as by soldering or welding, a depending post 24 whose lower end carries an arcuae nose bridge engaging element 25. Post 24, which is rigid and not readily bendable, extends forwardly a short distance from bar 23 and curves downwardly and then rearwardly to a terminal 26 lying rearwardly of the plane of the lenses supported by the attachment.

Nose engaging element 25 is loosely and rockably mounted on terminal 26 as by a loose hinge joint 27 which, while permitting substantial universal rocking of element 25 to adapt itself to the wearer's nose, nevertheless limits that movement to such extent that element 25 is maintained with its concave surface facing rearwardly so as to be always located in nose engaging position when the device is being attached. Element 25, by automatically adapting itself to the wearer's nose, enables the attachment to be fitted into the plane of the lenses.

At opposite ends, bar 23 is provided with resilient lens attaching portions 28 and 29 respectively. As illustrated in Figure 1, where the terminals of rigid bar 23 are designated at 31 and 32, each of these lens attaching portions preferably comprises a relatively thin, flat metal strip which is bendable and resilient in the plane of the lenses but rigid in all other planes.

Preferably end portions 28 and 29 are flat spring elements soldered, welded or otherwise integrally united to bar 23 at ends 31 and 32 respectively. Alternatively, end portions 28 and 29 may comprise integral extensions of thick bar 23 which have been hammered thin to obtain the desired resiliency.

End portions 28 and 28 are preferably identical and of the same width and material as bar 23, but are only about one-third as thick as bar 23. Points 31 and 32 are preferably located in alignment with the vertical centers of the lenses or outwardly laterally thereof.

End portion 28 has rigidly united thereto, as by soldering or welding a short, rearwardly extending lens edge or rim engaging clip 33 preferably located adjacent point 31 so that it fits over the top edge of the lens edge or rim well above the horizontal center line of the lenses. Clip 33 terminates in an integral, downwardly and radially inwardly projecting lip 34 which engages the rear surface of the lens edge or rim.

Adjacent its free end, portion 28 has similarly secured thereto a short rearwardly extending lens edge or rim engaging clip 35 located to fit over the bottom edge of the lens well below the horizontal center line of the lenses. Clip 35 terminates in an integral downwardly and radially inwardly projecting lip 36 which engages the rear surface of the lens edge or rim.

Similarly, end portion 29 is provided with rigid rearwardly extending clips 37 and 38 located above and below the horizontal center line of the lenses, respectively; and clips 37 and 38 are formed with radially inturned integral lips 39 and 41, respectively, which engage the rear surface of the lens edge or rim at that side. The clips on end portions 28 and 29 are preferably symmetrically arranged and made of the same flat spring material as end portions 28 and 29. Preferably lips 34, 36, 39 and 41 lie in substantially the same general plane as the nose contacting face of element 25.

End portion 28 terminates in an outwardly and slightly upwardly curved projection or finger piece 42, and a similar finger piece or projection 43 is provided upon end portion 29.

Projections 42 and 43 are preferably relatively rigid, short integral extensions of portions 28 and 29, respectively, but if desired they may be separate elements rigid therewith or of any suitable equivalent construction. Furthermore, although it is preferable to locate the projections at the terminals of the end portions as above described, they may be located at any suitable points along the end portions as will later appear.

It is further not essential that the projections extend in the plane of the lenses as they may project forwardly or at any suitable angle at which they are readily accessible to the wearer's fingers without departing from the spirit of the invention.

The essential purpose of projections 42 and 43 is to provide grips which are of sufficient size and suitable shape to be grasped by the fingers of the wearer and pulled oppositely outwardly to expand the attachment laterally due to swinging and displacement of the end portions by reason of their effective hinging at points 31 and 32 and their inherent resiliency, which latter enables them to be deformed in their common plane.

This outward expansion of the attachment enables it to be readily and speedily attached to and removed from the eyeglasses with a minimum of effort.

With reference to Figure 1, which illustrates the attachment in use, rigid bar 23 extends parallel to the horizontal center line of the lenses, while end portions 28 and 29 curve downwardly generally along the outer edges of lenses 11 and 12. Clips 33 and 35 are hooked over the edges of lens 14 with lips 34 and 36 frictionally engaging the rear surface of the lens along its outer edge. Clips 37 and 38 are similarly hooked over the edges of lens 15 with lips 39 and 41 frictionally engaging the rear surface of the lens along its outer edge.

In the above manner, lenses 14 and 15 are firmly and frictionally gripped by the end portions 28 and 29 and supported by bar 23.

The attachment is supported on the wearer's nose by post 24. Rockable element 25 is shaped to fit the nose bridge and may be faced with any suitable material resistant to perspiration or enhancing comfort at the area of contact.

Since post 24 is rigid with bar 23 and of constant length normally, bar 23 is positioned a predetermined distance above the eyes and the lenses gripped by the end portions of the bar are elevated beyond the position they assumed when supported by pads 18, 19. This elevation is preferably sufficient to locate the central areas of reading segments 16 and 17 in the direct line of vision of the wearer. The amount of elevation is preferably equal to the vertical distance between centers of the distance and reading lens portions. While post 24 is rigid to all normal wear stresses and the like, it may be bent by a suitable tool to alter the vertical distance between pad 25 and bar 23 and thereby permanently adjust the attachment to suit a given eyeglass.

Location of lips 34, 36, 39 and 41 and nose engaging element 25 in substantially the same plane rearwardly of the lenses insures a balance of reactive forces between the wearer's head and the attachment supported eyeglasses, and results in a steady fool-proof support for the glasses at the correct distance in front of the eyes.

To remove the attachment from the eyeglass, the wearer merely grasps projections 42 and 43 with the thumbs of his hands and, with his forefingers overlying the rigid bar 23, pulls laterally outwardly and then upwardly to laterally expand the attachment and dislodge end portions 28 and 29 from the lens edges. Due to the location of projections 42 and 43 at the terminals of the resilient end portions, thereby affording considerable leverage for displacing the end portions, the above operation is carried out swiftly and safely. The weight of the eyeglasses and the support afforded by the temples assist in preventing the eyeglasses from being accidentally pulled from the wearer's face while the attachment is being removed; and, after removal, the eyeglasses simply settle into their accustomed place on the wearer's nose.

Projections 42 and 43 eliminate smearing of the lenses by avoiding contact with the wearer's hands, and provide a convenient, safe and efficient manner of handling the attachment.

In order to replace the attachment to the position illustrated in Figure 1, it is only necessary to reverse the above procedure by pulling outwardly on projections 42 and 43 until end portions 28 and 29 can be slipped over the lens edges and then seating the nose pad 25 properly on the nose, thereby elevating the eyeglasses the desired distance.

It will be evident that the above described attachment is capable of being used with any type of eyeglasses regardless of the nature of the bridge or temple construction. The attachment is applicable equally well to rimmed and rimless eyeglasses and in the claims the term "lens unit" refers to either rimmed or rimless lens units. The whole attachment is preferably made of the same material, usually a suitable metal or alloy which has the desired rigidity and spring characteristics above described and is soft enough to avoid scratching the lens surfaces.

If desired projection 43 may be formed at its free end with a suitable aperture for receiving an eyeglass ribbon which may be attached to the clothing of the wearer in a suitable manner.

It is further within the scope of the invention to provide rigid end portions at 28 and 29 of the attachment and connect them to grid bar 23 by a suitable spring biased hinge or the like.

Figure 4:
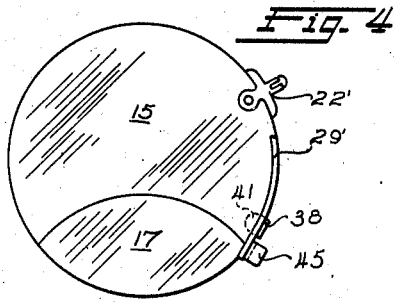
Figure 4 is a fragmentary front elevation illustrating one end of a further form of my attachment having a U-shaped finger grip device.
Figure 6:
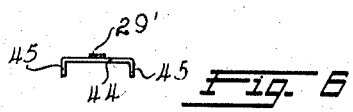
Figure 6 is a section taken along line 6—6 of Figure 5.
Figure 5:
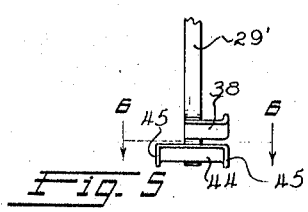
Figure 5 is a side elevation of the attachment of Figure 4.

In the embodiment illustrated in Figures 4, 5 and 6, end portion 29', which is flexibly connected to one end of the rigid cross bar as above described, is provided below clip 38 with a modified form of finger gripping projection 44.

Projection 44 comprises preferably an integral strip of the same flat spring material as clip 38 rigidly united as by soldering to end portion 29'. Projection 44 is substantially U-shaped and projects forwardly and rearwardly of the plane of the attachment and terminates in outwardly bent lugs 45 (Figure 6) of sufficient size to be gripped by the thumb and finger. A similar preferably identical finger grip projection is provided at the opposite terminal end of the attachment.

Arcuate terminal projections 42 and 43 are usually dispensed with in this embodiment of the attachment.

In use, this embodiment of the attachment is manipulated in substantially the same way as that of Figures 1-3, with lugs 45 being gripped between the thumb and a finger of each hand.

This form of the attachment has all of the advantages attributed above to that of Figures 1-3 and provides an extremely firm grip on the attachment without danger of smearing the lenses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An elevating attachment for multifocal eyeglasses of the type having a conventional bridge extending between lens units containing reading and distance lens portions, said attachment comprising a rigid cross bar terminating at opposite ends in resilient levers of sufficient length and contour to extend substantial distances along the outer edges of the lens units, a nose engaging element mounted on a support member depending from the medial portions of said cross bar, clips on said resilient levers adapted to interfit with said lens unit edges to securely fasten the attachment to said eyeglasses and thereby hold the eyeglasses in elevated position with the reading lens portion in the direct straight ahead line of vision of the wearer, and means providing rigid outstanding finger grip projections adjacent the terminals of each of said resilient levers to enable the wearer to grasp said projections to exert considerable leverage for displacing said resilient levers laterally outwardly to laterally expand the attachment for swifty and safely mounting and dismounting said attachment.

2. An elevating attachment for multifocal eyeglasses of the type having a conventional bridge extending between lens units containing reading and distance lens portions, said attachment comprising a rigid cross bar, thin, flat spring levers extending from opposite ends of said cross bar and shaped to conform generally to the outer side contours of said lens units, a support for said attachment secured to said cross bar and comprising a nose engaging member, spaced frictional lens gripping clips on said spring levers, said spring levers providing means for laterally expanding the attachment when it is mounted on the eyeglasses and said spring levers and frictional clips being adapted to hold the said attachment securely to said eyeglasses, and integral rigid finger grip pieces on said spring levers comprising relatively short outwardly bent terminals on said spring levers to enable the wearer to grasp said projections to exert considerable leverage for displacing said spring levers laterally outwardly to laterally expand the attachment for swiftly and safely mounting and dismounting said attachment.

CHARLES L. MOWRER.